A. WHITTEMORE,
Assignor of two-thirds interest to S. S. ARNOLD & W. W. WILSON.
Peg-Cutter.
No. 8,572. Reissued Feb. 4, 1879.
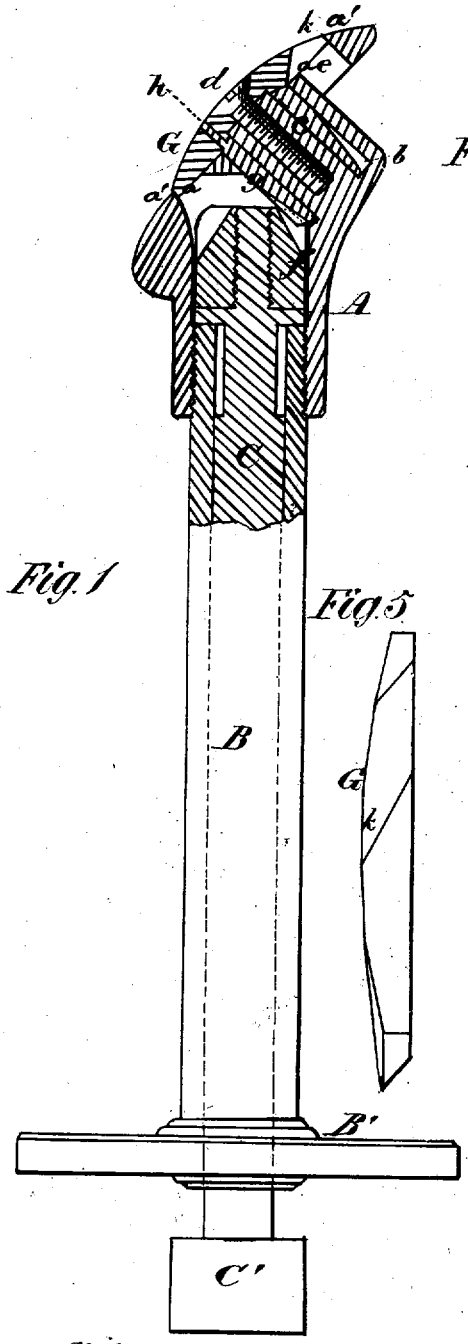
Fig. 1
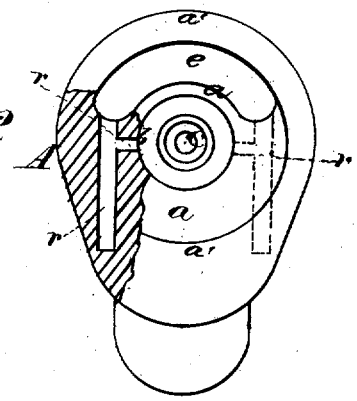
Fig. 2
Fig. 3
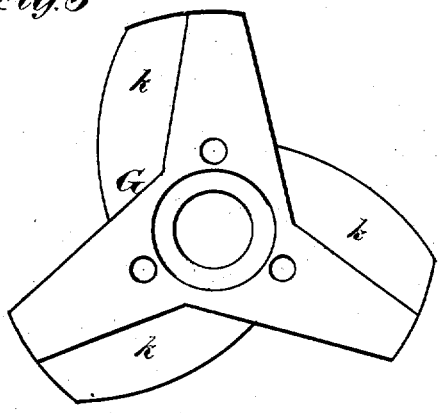
Fig. 5
Fig. 4
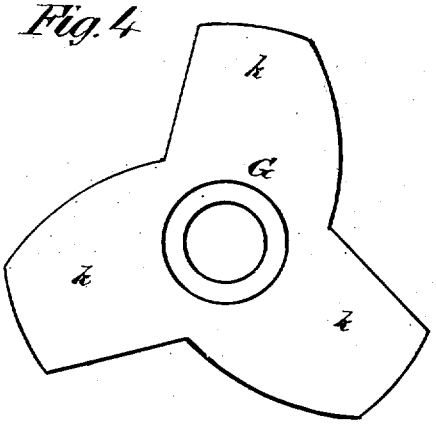
Witnesses,
R. G. Campbell
D. Lewis Blackford
Inventor
Amos Whittemore.
per. R. G. Campbell Attorney
N. PETERS, PHOTO-LITHOGRAPHER, WASHINGTON, D. C.

UNITED STATES PATENT OFFICE

AMOS WHITTEMORE, OF CAMBRIDGEPORT, MASS., ASSIGNOR OF TWO-THIRDS INTEREST TO SAMUEL S. ARNOLD AND WM. W. WILSON.

IMPROVEMENT IN PEG-CUTTERS.

Specification forming part of Letters Patent No. 157,145, dated November 24, 1874; Reissue No. 8,572, dated February 4, 1879; application filed January 6, 1879.

*To all whom it may concern:*

Be it known that I, AMOS WHITTEMORE, of Cambridgeport, in the county of Middlesex and State of Massachusetts, have invented a new and valuable Peg-Cutter; and I do hereby declare that the following is a full, clear, and exact description of the construction and operation of the same, reference being had to the annexed drawings, making part of this specification, and to the letters and figures marked thereon.

Figure 1 of the drawings is a representation of a sectional view of my peg-cutter. Fig. 2 is a top view. Figs. 3 and 4 are top and bottom views of a three-blade cutter-head. Fig. 5 is an edge view of Fig. 4.

This invention has relation to instruments which are designed for trimming the ends of pegs on the inside of boots and shoes; and the nature of my invention consists, mainly, in rotary convex cutting blades or leaves, in combination with a guard or shield, which will prevent the cutting-blades from injuring the leather of the boots or shoes during the cutting operation, as will be hereinafter explained.

The invention also consists in an open rotary peg cutter or trimmer, in combination with a hole through the back of the head-stock for the escape of the peg-chips; also, in a hub or stud, which is rigid on the head-stock and centrally located with respect to the circular recess, in which the cutting blade or blades are applied.

Other features of my invention will be fully explained in the following specification.

In the annexed drawings, A designates the head-stock, which is shaped somewhat like a shoe with the sole turned upward and inclined, as shown in Fig. 1. The upper side of the stock A has a circular recess, *a*, in it, which leaves a rigid guard, shield, or rim, *a'*, that prevents the leather from being cut during the operation of the machine. The stock A is also constructed with a central circular cavity, *b*, surrounding a hub or stud, *c*, which is rigid with the stock, and which has a screw-threaded hole to receive a screw, *d*. There is also a hole, *e*, through the stock A for allowing a free escape of the chips or bits of pegs.

The stock A is constructed with a tubular shank, which is screwed fast on the upper end of a tubular standard, B, having a flanged foot-stand or base, B'. Inside of the standard B is a spindle, C, carrying a belt-pulley, C', on its lower end, and a beveled spur-wheel, *f*, on its upper end. The wheel *f* engages with a spur-wheel, *g*, which turns on stud *c*, and has studs *h* on its upper end, and also a beveled burr, as shown in Fig. 1.

G designates my improved cutter, having three cutting blades or leaves, *k*; but two blades may be used. This cutter G is perforated to receive the studs *h*, and thus allow it to be secured to the spur-wheel *g* by means of the screw *d*.

The top of the cutter is convex or slightly bulging, to adapt it to the concave surfaces of the inside of the soles of boots and shoes, and the cutting-edge of each blade or leaf *k* is represented as being curved.

The cutting-edge of each blade or leaf *k* is formed by under-beveling, as shown by Figs. 3 and 5, and the bottom of each blade is flat, and lies on the bottom of the circular recess *a* in the head-stock A, so that during the operation of cutting off the pegs the chips will be discharged by the blade or blades down through the hole *e*, and will not clog them or collect beneath or in front of the cutting-edges.

It will be seen by reference to Fig. 2 that I provide for lubricating the parts by means of recesses *r r'*, formed in the head-stock A. The oil is put into the holes *r*, and will flow into the space *b* through the passages *r'*.

It will be seen from the above description that the cutter G is so formed by under-beveling the edge of each blade, and shaping the upper side thereof, that it can be quickly sharpened on a stone without drawing the temper of the metal; also, that the top as well as the under side of each blade can be readily sharpened, thus leaving a cutting-edge free from a burr, and with a bearing-surface the full width of the blade. It will also be seen that the peg-chips are free to pass downward from each cutting-edge and escape through the open back of the head-stock A.

Having described my invention, I claim—

1. In a peg-float or peg-cutter, a convex rotary cutting blade or leaf, *k*, the cutting-edge of which extends outward and downward from its axis of motion, and is formed by under-beveling, substantially as described.

2. In a peg-cutter, one or more convex rotary cutting-blades, *k*, in combination with a head-stock, A, and a guard or shield, *a'*, substantially as described.

3. In a peg-cutter, one or more rotary cutting-blades, *k*, in combination with a perforated head-stock, which will allow the escape of peg-chips through it, substantially as described.

4. The stud *c*, in the center of recess *b*, and rigid on the head-stock A, in combination with a pinion, *g*, and a rotary peg-cutter, substantially as described.

5. In a peg-cutter, the convex rotary cutter-head G, provided with curved cutting-blades *k*, and applied in a head-stock, A, substantially as described.

6. In combination with the head-stock A, its rotary cutter-head G, and annular recess *b*, the oil-holes *r r'*, for the purpose described.

AMOS WHITTEMORE.

Witnesses:

R. T. CAMPBELL,

B. LEWIS BLACKFORD.